UNITED STATES PATENT OFFICE.

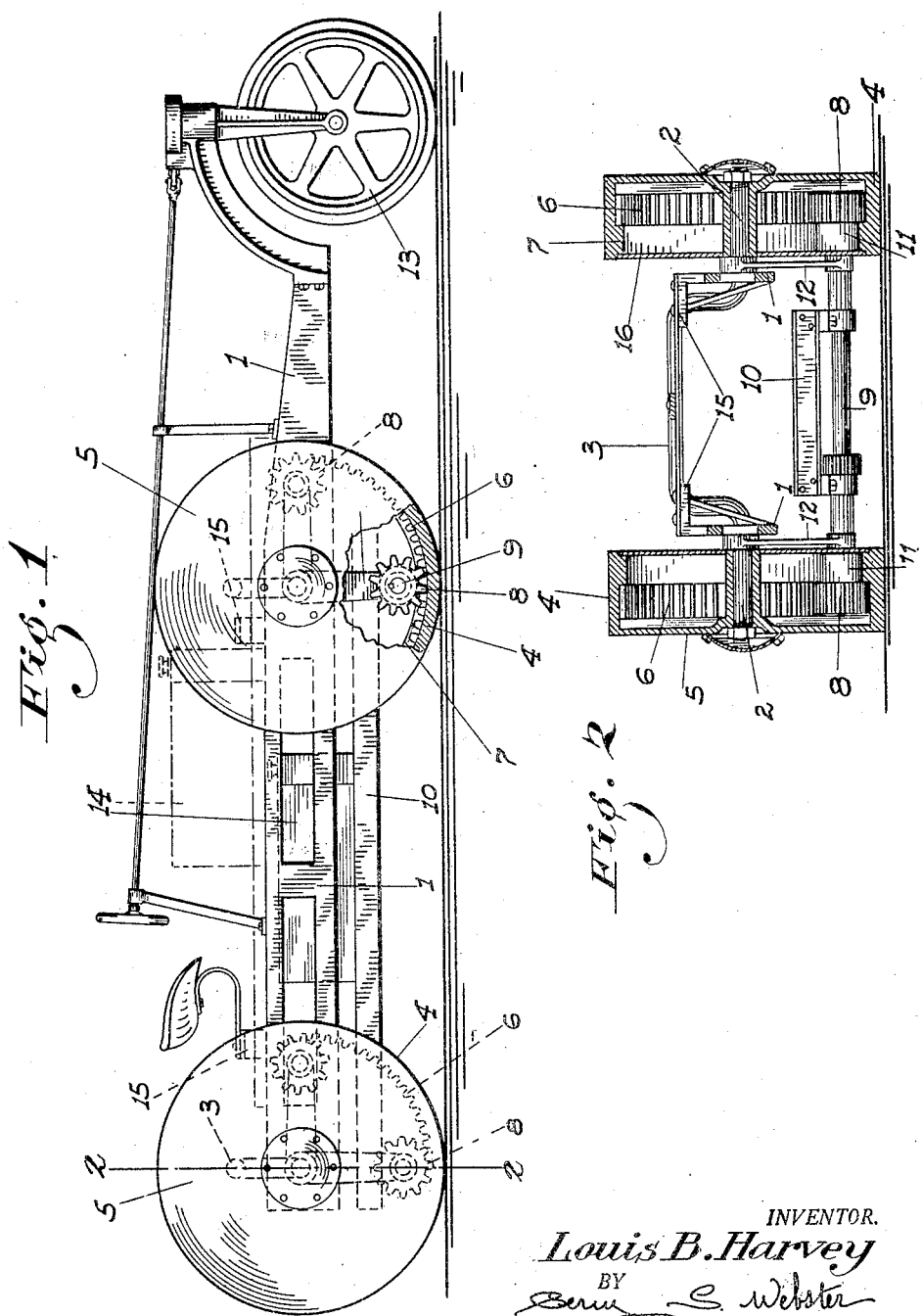

LOUIS B. HARVEY, OF STOCKTON, CALIFORNIA.

TRACTOR.

1,312,982.  Specification of Letters Patent.  Patented Aug. 12, 1919.

Application filed August 15, 1918. Serial No. 249,984.

*To all whom it may concern:*

Be it known that I, LOUIS B. HARVEY, a citizen of the United States of America, residing at Stockton, in the county of San Joaquin, State of California, have invented certain new and useful Improvements in Tractors; and I do declare the following to be a clear, full, and exact description of the same, reference being had to the accompanying drawings, and to the characters of reference marked thereon, which form a part of this application.

This invention relates to tractors and particularly to the wheel-drive type, the principal object of the invention being to produce a tractor in which the driving power and weight of the machine will be taken off the perpendicular center line of the wheels and be thrown forward thereof, and will thus exert a direct downward pressure ahead of such center instead of a horizontal pressure.

This will be found particularly advantageous when pulling a heavy load or when the tractor is mired as the weight and driving power are then automatically thrown forward of the center or lowest point of the wheels and can exert a greater leverage to turn the wheels and raise the tractor from its mired position. Hence, a much lighter and less powerful machine may be constructed to accomplish the same results now obtained by the use of heavy, powerful tractors.

A further object of the invention is to produce a tractor which will be simple of operation and construction, and yet one which will be extremely efficient for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of the complete tractor.

Fig. 2 is a section taken on a line 2—2 of Fig. 1.

Referring now more particularly to the characters of reference on the drawings, the numeral 1 designates the frames of the machine, suitably spaced apart, to which are secured axles 2 which are stationary and are bent upwardly between the frames as at 3 for a purpose as will appear. Turnable on these axles are wheels 4 having solid outer faces 5 in place of spokes. Each wheel has an annular gear 6 therein, and a smooth runway 7. Meshing with gears 6 are pinions 8 secured to shafts 9 turnably mounted on the underside of a frame 10. Rollers 11 on the shafts 9 ride on the runway 7 and prevent the teeth of the gears 6 and 8 from meshing too deeply.

The frame 10 is narrower than the frame 1 and is swung on radius rods 12 between the axles 2 and the shafts 9. A steering wheel 13 is mounted on the frames 1 ahead of the wheels, or the machine may be steered by interposing suitable clutches, etc., in the shaft 9, whereby one of the gears 8 may be held stationary or reversed while the other is turning forward.

A gas engine 14 or similar power plant is mounted on the frame 10, and connected in driving relation to the shaft 9 by any suitable means (not shown).

The frames 1 are provided at suitable points with projections 15 for a purpose as will appear. The inner faces of the wheels 4 are provided with disks 16 mounted on the shafts 9 and turnable therewith in order to keep dirt from getting in the gear teeth.

The operation is as follows: Supposing the tractor to be pulling a light load over a good road, the driving gears 8 remain in mesh with the gears 6 in the position shown in Fig. 1. If, however, a hill is climbed or the tractor strikes a rough and muddy road, the gears 8 start to climb on the gears 6, much in the same manner as the squirrel in its treadmill. This action throws the main weight and driving power of the tractor forward of the center of the wheels, and a greater turning or rolling effort is obtained to ride the tractor out of a mudhole or pull a heavier load. Should the gears continue to climb, they are permitted to do so until the point of maximum efficiency is reached, which is at the horizontal center line of the wheels, when the frame 10 impinges against one of the axles 2 at the bent portion 3 thereof, and against the projections 15 on the frames 1. This gives an additional leverage to the driving power of the machine to turn the wheels.

By thus throwing the main weight of the machine forward of the wheel centers, the tendency of a machine to mire still further in the mud, owing to its weight being central of the wheels, is eliminated.

Thus, from the foregoing description it will readily be seen that I have produced such a device as substantially fulfils the objects of the invention as set forth herein.

While this specification sets forth in detain the present and preferred construction of the device, still in practice, such deviations from such details may be resorted to as do not form a departure from the spirit of the invention, as defined by the appended claims.

Having thus described my invention, what I claim as new and useful and desire to secure by Letters Patent is:—

1. A wheel tractor comprising a frame, axles secured to the frame, wheels turnable on the axles, annular gears in the wheels, driving pinions meshing with the gears, shafts on the gears turnably mounted on an inner frame, and radius rods pivotally connecting said axles and said shafts whereby the inner frame is free to turn about the axles as a center.

2. A wheel tractor comprising a frame, axles secured to the frame, wheels turnable on the axles, annular gears in the wheels, driving pinions meshing with the gears, shafts on the gears turnably mounted on an inner frame, radius rods pivotally connecting said axles and said shafts whereby the inner frame is free to turn about the axles as a center, and projections on the first named frame adapted to impinge against the inner frame when the pinions have swung on the radius rods and have climbed around the wheels to the point of maximum power-exerting efficiency thereon.

In testimony whereof I affix my signature in presence of two witnesses.

LOUIS B. HARVEY.

Witnesses:
   VERADINE WARNER,
   BERNARD PRIVAT.